(12) United States Patent
Wigard et al.

(10) Patent No.: US 11,711,760 B2
(45) Date of Patent: Jul. 25, 2023

(54) CARRIER SELECTION IN WIRELESS NETWORK

(71) Applicant: Nokia Technologies Oy, Espoo (FI)

(72) Inventors: Jeroen Wigard, Klarup (DK); Mads Lauridsen, Gistrup (DK); Pilar Andrés Maldonado, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/170,426

(22) Filed: Feb. 8, 2021

(65) Prior Publication Data

US 2021/0306942 A1 Sep. 30, 2021

(30) Foreign Application Priority Data

Mar. 27, 2020 (EP) .................................... 20166268

(51) Int. Cl.
*H04W 48/20* (2009.01)
*H04B 7/185* (2006.01)
*H04W 76/30* (2018.01)
*H04W 76/27* (2018.01)
*H04W 64/00* (2009.01)

(52) U.S. Cl.
CPC ........ *H04W 48/20* (2013.01); *H04B 7/18513* (2013.01); *H04B 7/18539* (2013.01); *H04W 64/00* (2013.01); *H04W 76/27* (2018.02); *H04W 76/30* (2018.02)

(58) Field of Classification Search
CPC ..... H04W 48/20; H04W 64/00; H04W 76/30; H04W 76/27; H04B 7/18513; H04B 7/18539
See application file for complete search history.

(56) References Cited

U.S. PATENT DOCUMENTS

| 5,649,291 | A | 7/1997 | Tayloe |
| 7,403,154 | B2 | 7/2008 | Garin et al. |
| 8,620,310 | B2 * | 12/2013 | Song ................. H04W 36/0072 370/254 |

FOREIGN PATENT DOCUMENTS

| EP | 3226620 A1 * | 10/2017 | ........ H04W 36/0072 |
| EP | 3255933 A1 * | 12/2017 | ........ H04W 36/0072 |
| EP | 3962154 A1 * | 3/2022 | ............ H04W 24/10 |
| WO | WO-2018010174 A1 * | 1/2018 | |
| WO | 2019/047085 A1 | 3/2019 | |

OTHER PUBLICATIONS

"3rd Generation Partnership Project; Technical Specification Group Radio Access Network; NR; User Equipment (UE) procedures in Idle mode and RRC Inactive state (Release 15)", 3GPP TS 38.304 V15.5.0, Sep. 2019, pp. 1-29.

(Continued)

*Primary Examiner* — Muthuswamy G Manoharan
(74) *Attorney, Agent, or Firm* — Nokia Technologies Oy (57) ABSTRACT

According to an example aspect of the present invention, there is provided a method comprising: receiving, from a network node, before entering a power saving state, an indication of a dependency between frequencies and time instances; identifying at least one frequency based on the indicated dependency and a moment of time; and selecting a cell utilizing the identified at least one frequency.

18 Claims, 5 Drawing Sheets

(56) References Cited

OTHER PUBLICATIONS

"3rd Generation Partnership Project; Technical Specification Group Radio Access Network; Solutions for NR to support non-terrestrial networks (NTN) (Release 16)", 3GPP TR 38.821, V1.0.0, Dec. 2019, pp. 1-143.

"New Study WID on NB-IoT/eTMC support for NTN", 3GPP TSG RAN Meeting #86, RP-193235, Agenda: xxx, MediaTek Inc., Dec. 9-31, 2019, 4 pages.

"3rd Generation Partnership Project; Technical Specification Group Radio Access Network; Evolved Universal Terrestrial Radio Access (E-UTRA); User Equipment (UE) procedures in idle mode (Release 15)", 3GPP TS 36.304, V15.4.0, Jun. 2019, pp. 1-55.

"3rd Generation Partnership Project; Technical Specification Group Radio Access Network; NR; Radio Resource Control (RRC) protocol specification (Release 15)", 3GPP TS 38.331, V15.7.0, Sep. 2019, pp. 1-527.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.7.0, Sep. 2019, pp. 1-962.

Extended European Search Report received for corresponding European Application No. 20166268.1, dated Oct. 19, 2020, 7 pages.

\* cited by examiner

CARRIER SELECTION IN WIRELESS NETWORK

FIELD

Various example embodiments relate to carrier selection in wireless systems.

BACKGROUND

Various measures have been developed for saving power for wireless devices. Allowing wireless devices to enter a low-power state when they are not transmitting or receiving data has always been an important part of achieving a balance between adequate communication performance and acceptable battery consumption. Current and future generation mobile systems include a growing number of new communication scenarios, as well as new device types, such as devices for machine-type communications (MTC), of wireless devices. A connected state for data transmission and a power-saving/idle state have been long used as radio resource control (RRC) states.

Some Internet of Things (IoT) devices may require very long battery life time target, such as 10 years or even more. This induces need for further power saving mechanisms, including extending sleep time periods during which the device does not receive signals from its associated network. A mobile device, waking up from a power saving mode, e.g. to transmit data, may need to perform carrier selection to obtain wireless data transmission connectivity.

SUMMARY

According to some aspects, there is provided the subject-matter of the independent claims. Some embodiments for some or all of the aspects are defined in the dependent claims.

According to a first aspect, there is provided a method, comprising: receiving, from a network node, before entering a power saving state, an indication of a dependency between frequencies and time instances; identifying at least one frequency based on the indicated dependency and a moment of time; and selecting a cell utilizing the identified at least one frequency.

According to a second aspect, there is provided a method, comprising: identifying a dependency between frequencies and time instances for use by a user equipment to connect to a cell; and transmitting an indication of the identified dependency to the user equipment.

According to a third aspect, there is provided an apparatus, comprising at least one processor, at least one memory including computer program code, the at least one memory and the computer program code being configured to, with the at least one processor, cause the apparatus at least to perform the method of the first aspect, or an embodiment thereof.

According to a fourth aspect, there is provided an apparatus, comprising at least one processor, at least one memory including computer program code, the at least one memory and the computer program code being configured to, with the at least one processor, cause the apparatus at least to perform the method of the second aspect, or an embodiment thereof.

According to a fifth aspect, there is provided an apparatus, comprising means configured for causing performing: receiving, from a network node, before entering a power saving state, an indication of a dependency between frequencies and time instances; identifying at least one frequency based on the indicated dependency and a moment of time; and selecting a cell utilizing the identified at least one frequency.

According to a sixth aspect, there is provided an apparatus, comprising means configured for causing performing: identifying a dependency between frequencies and time instances for use by a user equipment to connect to a cell; and transmitting an indication of the identified dependency to the user equipment. An apparatus configured to perform the method of the first aspect may be a cellular user equipment device, or for/comprised by a cellular user equipment device. The apparatus configured to perform the method of the second aspect may be a network node or device, or for/comprised by a network node/device. In some embodiments, the apparatus is or is comprised by a radio access network node or a core network node.

According to some further aspects, there is provided a computer program, a computer program product, a computer readable medium, or a non-transitory computer readable medium comprising program instructions for causing an apparatus to perform the method according to any one of the above aspects or an embodiment thereof.

According to an example embodiment of any of the aspects, the dependency is based on at least one of: location information of the apparatus, frequency reuse information, or satellite ephemeris data.

According to an example embodiment of any of the aspects, information indicating location of the user equipment is transmitted to the network node prior to receiving the indication.

According to an example embodiment of at least some of aspects, the at least one frequency is identified further based on location of the apparatus/user equipment.

According to an example embodiment of at least some of the aspects, the network node is a radio access network node configured for a satellite unit or configured to communicate with the user equipment via a satellite unit. The user equipment may be configured for connecting or camping to the cell of the radio access network node by tuning to the identified at least one frequency.

According to an example embodiment of the second, fourth and sixth aspect, information indicating location of the user equipment is received and the identifying is based on the information indicating the location of the user equipment.

According to an example embodiment of any of the aspects, the dependency comprises a list of frequencies as a function of time or at least one time window for prioritizing at least one frequency.

According to an example embodiment of any of the aspects, the indicated dependency is further associated with at least one location or area on Earth and/or with satellite beam footprint.

According to an example embodiment of any of the aspects, the indication is comprised in radio resource control signaling, wherein the radio resource control signaling is preferably radio resource control release message.

DETAILED DESCRIPTION

Figure 1:
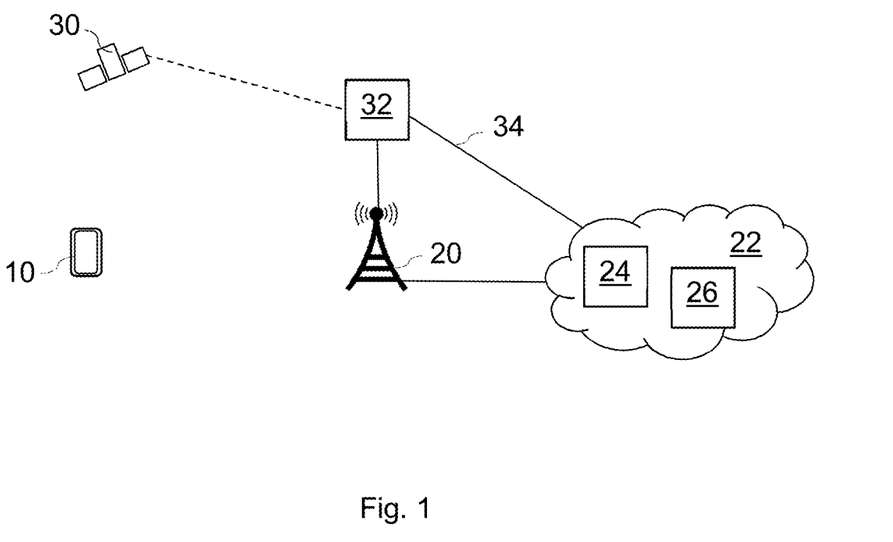
FIG. 1 illustrates a system example in accordance with at least some embodiments.

FIG. 1 illustrates a simplified example system. A user equipment (UE) 10 communicates wirelessly with a wireless radio or access network node, hereafter referred to as AN, 20, such as a NodeB, an evolved NodeB (eNB), a Next Generation (NG) NodeB (gNB), a base station, an access point, or other suitable wireless/radio access network device or system.

The UE 10 may be within a cell or coverage area of the AN 20 and attached to the AN 20 for wireless communications. The air interface between UE and AN may be configured in accordance with a Radio Access Technology, RAT, which both the UE 10 and AN 20 are configured to support.

Examples of cellular RATs include Long Term Evolution, LTE, New Radio, NR, which is also known as fifth generation, 5G, and MulteFire. On the other hand, examples of non-cellular RATs include Wireless Local Area Network, WLAN, and Worldwide Interoperability for Microwave Access, WiMAX. Principles of the present disclosure are not limited to a specific RAT though. For example, in the context of LTE, AN 20 may be a nodeB or evolved Node B (eNB), while in the context of NR, AN 20 may be a gNB.

The AN 20 may be connected, directly or via at least one intermediate node, with one or more nodes, devices or elements 24, 26 of a core network 22, such as a Next Generation core network, Evolved Packet Core (EPC), or other network management element. The core network 30 may comprise a set of network functions. A network function may refer to an operational and/or physical entity. For example, the node 24, 26 may be a network function or be configured to perform one or more network functions. The network function may be a specific network node or element, or a specific function or set of functions carried out by one or more entities, such as virtual network elements. Examples of such network functions include an access control or management function, mobility management or control function, session management or control function, interworking, data management or storage function, authentication function or a combination of one or more of these functions.

For example, a 3GPP 5G core network comprises Access and Mobility Management Function (AMF) which may be configured to terminate (radio access network) RAN control plane (N2) interface and perform registration management, connection management, reachability management, mobility management, access authentication, access authorization, Security Anchor Functionality (SEAF), Security Context Management (SCM), and support for interface for non-3GPP access.

The core network 24 may be, in turn, coupled with another network (not shown), via which connectivity to further networks may be obtained, for example via a worldwide interconnection network. The AN may be connected with at least one other AN as well via an inter-base station interface, particularly for supporting mobility of the UE 10, e.g. by 3GPP X2 or similar NG interface.

The UE 10 may be referred to as a user device or wireless terminal in general. Hence, without limiting to Third Generation Partnership Project (3GPP) User Equipment, the term user equipment is to be understood broadly to cover various mobile/wireless terminal devices, mobile stations and user devices for user communication and/or machine to machine type communication. The UE 10 may be or be comprised by, for example, a smartphone, a cellular phone, a Machine-to-Machine, M2M, node, machine-type communications node, an Internet of Things, IoT, node, a car telemetry unit, a laptop computer, a tablet computer or, indeed, another kind of suitable user device or mobile station, i.e., a terminal.

Although the apparatuses have been depicted as single entities, different units, processors and/or memory units (not shown in FIG. 1) may be implemented inside these apparatuses, to enable the functioning thereof. The system may also be able to support the usage of cloud services, for example at least part of core network operations may be carried out as a cloud service. The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. One of the concepts for 5G networks is network slicing in which multiple independent and dedicated virtual sub-networks (network instances) may be created within the same infrastructure to run services that have different requirements on latency, reliability, throughput and mobility.

A person skilled in the art will realize that the depicted system is only an example of a part of a system and in practice, the system may comprise further access nodes, the user device may have an access to a plurality of radio cells and the system may comprise also other apparatuses, such as physical layer relay nodes or other core network functions or elements, etc. A cellular radio system may be implemented as a multilayer network including several kinds of cells, such as macrocells, microcells and picocells, for example. Typically, in multilayer networks, one access node provides one kind of a cell or cells, and thus a plurality of NodeBs are required to provide such a network structure. 5G may also utilize satellite communication to enhance or complement the coverage of 5G service, for example by providing backhauling.

The UE 10 may be configured to communicate with a non-terrestrial network (NTN), such as the NTN device or unit 30 illustrated in FIG. 1. NTN may refer to a network, or segment of networks using RF resources on board a satellite, or an unmanned aerial system (UAS) platform, such as drones or high altitude platform systems (HAPS), with predictable movement and using multiple frequencies. For example, 3GPP is studying provision of 5G NR service to users on Earth through Low-Earth Orbit (LEO) satellites.

The NTN unit 30 may generate one or more beams over a given service area bounded by its field of view. A service link or radio link may be established between the user equipment and the NTN unit 30, such as a satellite. One or several gateways, such as sat-gateways, may provide a feeder link and connect the NTN unit 30 to a public data network. Inter-satellite links (ISL) may be applied in case of a constellation of satellites.

In the example of FIG. 1, at least one AN 20 is connected to an NTN gateway 32 configured to provide a feeder link for the NTN unit 30. In an example embodiment, the AN 20 is a gNB of a NG-RAN which also comprises a satellite (as the NTN unit 30) and the NTN gateway 32. The satellite and the NTN gateway may form a remote radio unit (RRU). The satellite may be configured to repeat 3GPP NR-Uu radio interface from the feeder link (between the NTN gateway 32 and the satellite) to the service link (between the satellite and the UE 10) and vice versa. The NTN GW supports functionality to forward or relay the signal of NR-Uu interface. Different (transparent) satellites may be connected to the same gNB on the ground. The radio bearers and RRC is thus between the UE and the gNB. Such system arrangement may be referred to as transparent satellite based RAN architecture.

In another example embodiment, at least some RAN functionality, such as gNB functionality, is included in the NTN unit 30. The NTN unit may be served by the NTN gateway 32 over a satellite radio interface SRI transport link. The NTN gateway 32, which thus may be connected 34 to the CN 22 and operate as a transport network layer node, supporting required transport protocols.

One challenge in NTN and LEO satellites is that the satellites move at rather high speed (7.5 km/s relative to Earth), which means that even non-moving devices experience a lot of mobility events, i.e. handovers and cell reselections. Enhanced-MTC (eMTC), such as narrowband-IoT (NB-IoT), communication over NTN is also studied. In an example embodiment, the UE 10, the AN 20, and the NTN device 30 are configured to support NB-IoT NTN communication for the UE. However, it will be appreciated that the present embodiments may be applied in many other NTN, terrestrial, and/or MTC systems.

As NB-IoT is designed for battery driven devices with a battery life time target of 10 years, a lot of attention has been spent on power saving mechanisms. Power Saving Mode (PSM) is designed to help IoT devices conserve battery power. When in PSM mode, the UE 10 is not listening to paging information and will only wake up when associated timer expires or when it has data to transmit. While the UE is in PSM, the network may retain state information and the device remains registered with the network. If a device awakes and sends data while PSM is configured, network registration procedure is thus not required. Therefore, battery life can be substantially extended if long PSM cycles are configured.

Extended discontinuous reception (eDRX) is an extension of the existing LTE feature DRX, which can be used by IoT devices to reduce power consumption. eDRX can be used without PSM or in conjunction with PSM to obtain additional power savings. eDRX allows the time interval during which a device is not listening to the network to be greatly extended as compared to DRX used at many smartphones. For the delay tolerant IoT applications that NB-IoT targets, it might be quite acceptable for the device to not be reachable for a few seconds or longer.

It has been recognized that frequency reuse larger than one may be required for NTNs in order to get acceptable performance. This means that the UE may change frequency at every cell change. Each satellite may utilize satellite beams to provide one or more NR beams or one or more NR cells, depending on deployment configuration.

With NB-IoT, the PSM and eDRX features may lead to the UE sleeping/being unavailable for quite some time (even minutes or hours). During this time, multiple satellites may have passed by (with a 50 km cell radius, the time in a cell is approximately 6 seconds) so when the UE wakes up, the frequency and cell may have changed completely.

Figure 2A:
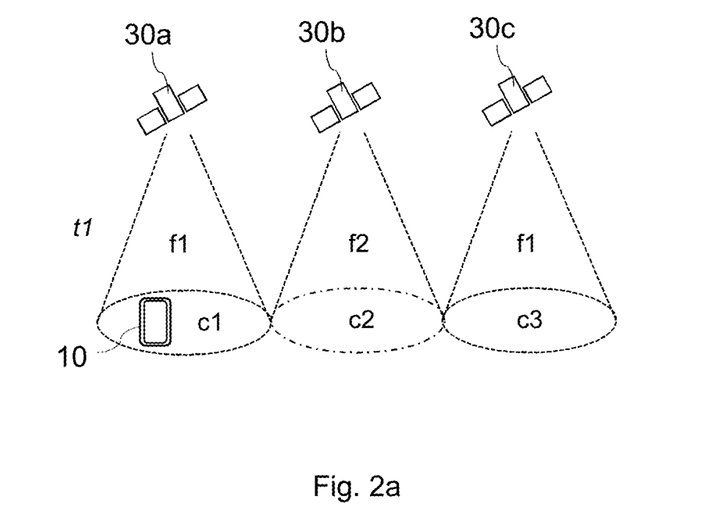
FIGS. 2a and 2b illustrate satellite communication examples.
Figure 2B:
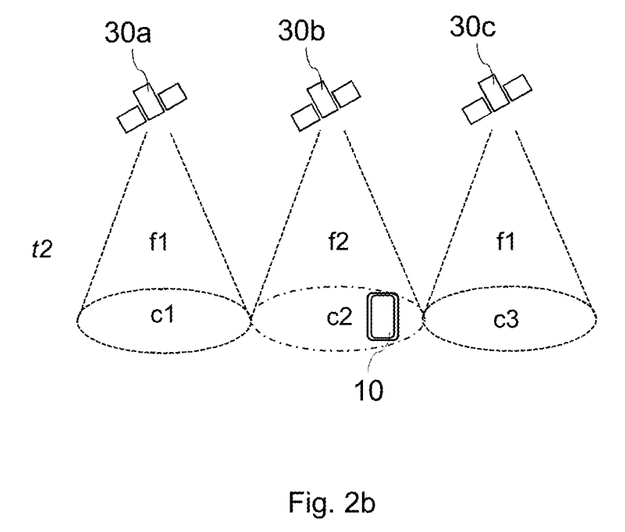

FIGS. 2a and 2b illustrate satellites 30a, 30b, 30c (orbiting) at time instances t1 and t2, respectively. Here it is assumed that the different cells use different frequencies f1 and f2 and frequency reuse.

FIG. 2a illustrates UE 10 communicating first at t1 in cell coverage of satellite 30a (cell c1, using carrier f1). FIG. 2b illustrates situation at t2, whereby the satellites have moved and the UE 10 is in the coverage area of satellite 30b (cell c2, using carrier f2).

If the UE 10 enters PSM at t1 and wakes up at t2, due to expiration of the timer or due to data in an uplink buffer pending transmission, the UE will try to synchronize with the (NTN) network. If the network has indicated a different prioritized frequency than f1, it will search on that frequency. Otherwise it will search on frequency f1. As the network does not know when the UE has data in the buffer and thus when it can become active, the network cannot indicate the preferred frequency. Thus, the UE may end up connected to satellite 30c/cell c3 when there is data in the buffer, because the UE, with extended coverage capabilities, may be able to receive signals sent on satellite 30c at f1 (being the same frequency as the old anchor cell c1). This leads to non-optimal behaviour, such as less efficient transmission.

Similarly, if the UE 10 moves into eDRX mode (assuming RRC idle mode) at time t1, the UE will listen to paging, but will search for a paging channel on f1. At time t2, the UE may listen to the paging channel of satellite 30c/cell c3. If cell c3 is in a different tracking area (TA), the UE will start a tracking area update (TAU) and update its paging area, such it can be reached through that cell, even though it would be more optimal to connect to satellite 30b/cell c2. This may lead to missing paging information for the UE and cause the UE sending unnecessary TAU.

There are now provided improvements for carrier selection, facilitating a user equipment waking up from a power saving mode to select an appropriate carrier frequency to connect or camp to e.g. an NTN-based cell.

Figure 3:
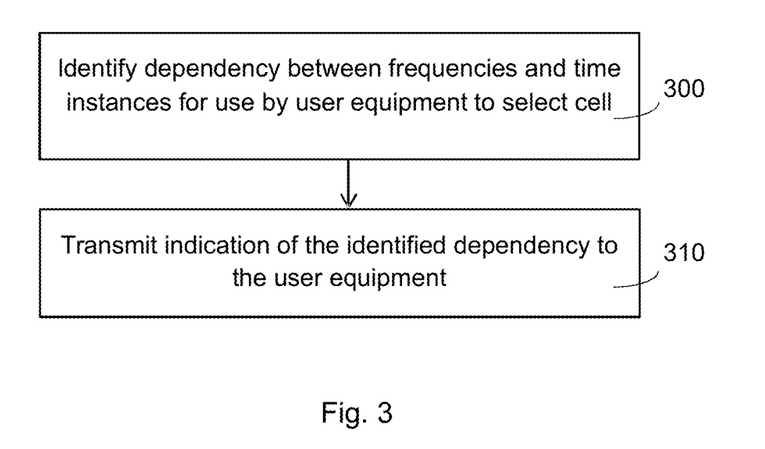
FIGS. 3 and 4 illustrate methods in accordance with at least some embodiments.

FIG. 3 illustrates a method for facilitating network assisted carrier selection. The method may be performed in or caused by a network node or device, such as a radio access network node AN 20, as also referred to in some further example embodiments, e.g. a gNB, in some embodiments a core network node 24, e.g. AMF, or a controller thereof.

Block 300 comprises identifying a dependency between frequencies and time instances for use by a user equipment to select a cell. Block 310 comprises transmitting an indication of the identified dependency to the user equipment.

Figure 4:
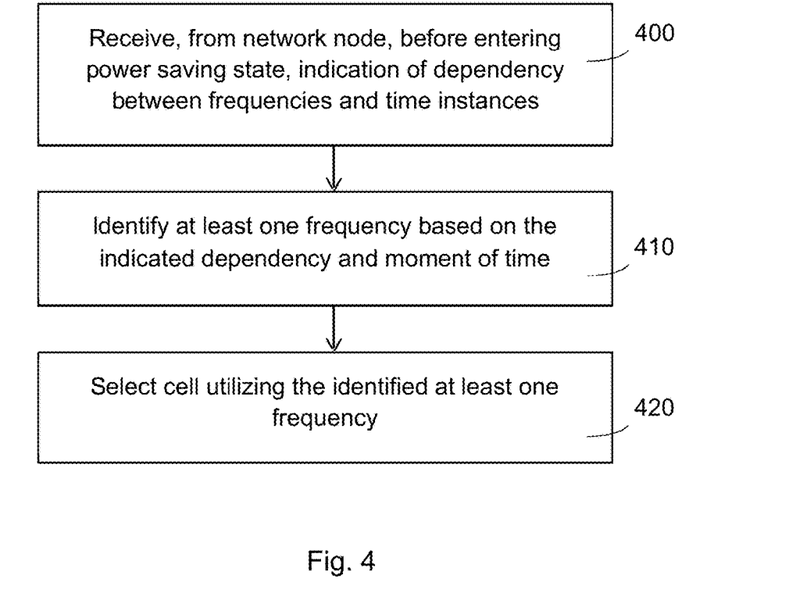

FIG. 4 illustrates a method for carrier selection in a wireless device or a user equipment/device in accordance with at least some embodiments. The method may be performed by a user equipment, such as the UE 10 also referred to as in the further example embodiments, or by a control device configured to control the functioning thereof, possibly when installed therein. It is to be noted that an action, such as transmitting, in a given block may refer to controlling or causing such action in another apparatus or unit.

Block 400 comprises receiving, from a network node, before entering a power saving state, an indication of a dependency between frequencies and time instances. Block 410 comprises identifying at least one frequency based on the indicated dependency and a moment of time. Block 420 comprises selecting a cell utilizing the identified at least one frequency.

The UE 10 may thus determine at least one frequency to search on based on the dependency. The UE may then connect the cell or camp on to the cell. The UE may initiate in or after block 420 TX and/or RX communication with the cell applying the frequency(-ies) identified in block 410. In some cases the UE may camp on or register to a new cell using the frequency after block 420, e.g. perform 3GPP 5G cell selection or reselection procedure. Another example is that the UE tunes into the frequency of the cell to monitor to paging or other system information. A still further example is that the UE starts RRC signalling to establish RRC connection with the network node, such as the gNB.

Power saving state refers generally to a state or mode for a wireless device with less activity than in another state or mode. The power saving state may also be referred to as an inactive, sleep or idle state or mode. The power saving state may be an RRC state, such as an RRC idle state or an RRC inactive state state, consuming less resources than an RRC state for active communication, such as an RRC connected state.

Block 410 may be entered after entering the power saving state after block 400, i.e. there may be at least one further block between blocks 400 and 410, comprising entering the power saving state. The frequency may be identified 410 while the UE is in the power saving mode. For example, the UE 10 may enter block 410 in response to initiating an RRC operation of the RRC_IDLE or RRC_INACTIVE state (illustrated in FIG. 6) triggered by a respective timer.

In some other example embodiments, the frequency is identified 410 after/in response to leaving the power saving state, or detecting need to leave the power saving state, e.g. in response to transitioning to the RRC connected state when there is uplink data to transmit.

The dependency may be based on at least one of: location information of the UE, frequency reuse information of the cells, satellite ephemeris data, or other UE behavior or control information. Some further example embodiments are illustrated below.

Information indicating location of the user equipment may be received by the network node before block 300. The information may be received from the UE and/or another source, such as another network node or function. The identifying 300 may thus be based on the information indicating the location of the user equipment. It is to be noted that in some example embodiments the network node is able to identify the dependency without receiving location information from the UE, e.g. based on current information it already has on the UE, including a network based estimate of the UE location.

The UE may thus be configured to transmit information for the network node indicating location of the UE prior to receiving 400 the indication of the identified dependency. The UE may report the position when registering to the RAN, periodically and/or upon request from the RAN, such as the gNB. The UE 10 may comprise a positioning unit, such as a GNSS unit, providing the location information.

The indicated dependency of block 310 and 400 may be further associated (by the network node) with at least one location or area on Earth and/or with satellite beam footprint. The UE 10 may be configured to identify the at least one frequency in block 410 on the basis of current location of the UE. For example, the frequency information may be associated with location or location area, and the UE may in block 410 select a frequency associated with current time and current location of the UE.

The information provided from the network node to the UE may comprise further guidelines. In an example embodiment, the network node may be configured to consider movement of the UE for generating the information of block 300. For example, the network node may predict UE movement or path on the basis of past movement of the UE based on received UE positions (and associated times). The network node may be configured to identify cells and associated carrier frequencies in the defined path of the UE and perform block 300 at least for these frequencies.

In some example embodiments, the network node is a RAN node configured at a satellite unit or configured to communicate with a cellular UE device via a satellite unit, e.g. the satellite 30a-30c. The cell may be a cell of the RAN node, provided by or via the satellite unit. The UE may be configured to connect or camp to the cell of the RAN node, by or via the satellite communications device, by tuning to the identified at least one frequency.

Ephemeris data comprises information about orbital trajectories of satellites. There are different possible representations of ephemeris data. With reference to Table 1 below, one possibility is to use orbital parameters, e.g. semi-major axis, eccentricity, inclination, right ascension of the ascending node, argument of periapsis, mean anomaly at a reference point in time, and the epoch. The first five parameters can determine an orbital plane, and the other two parameters are used to determine exact satellite location at a time.

TABLE 1

| | Ephemeris parameters | |
|---|---|---|
| Orbital plane parameters | $\sqrt{a}$ | Square root of semi major axis (semi-major axis) |
| | e | Eccentricity (eccentricity) |
| | $i_0$ | Inclination angle at reference time (inclination) |
| | $\Omega_0$ | Longitude of ascending node of orbit plane (right ascension of the ascending node) |
| | $\omega$ | Argument of perigee (argument of periapsis) |
| Satellite level parameters | $M_0$ | Mean anomaly at reference time (true anomaly and a reference point in time) |
| | $t_{0e}$ | Ephemeris reference time (the epoch) |

In some embodiments, at least some of the presently disclosed features are applied for 3GPP based communication systems. The UE may be a 5G User Equipment and the network node may be an gNB. Some further such example embodiments with non-limiting references to these entities are illustrated below.

In some embodiments, a CN node, such as the AMF, may be configured to perform the method of FIG. 3, defines (300) dependency between frequencies and time instants and transmits indication of the dependency to a RAN node, such as the gNB. The RAN node may identify (300) the dependency based on the information received from the CN node and transmit (310) the dependency to the UE via terrestrial or non-terrestrial radio path. In another example embodiment, the RAN node defines the dependency.

The time instances in blocks 300 and 400 may include or be based on network knowledge of UE behaviour, such as communication timing information. The network node may have information of specific time instances when the UE is awake and monitoring the cell according to the applied DRX or PSM scheme. The network node may apply this information in block 300 for defining the dependency as the time instance(s) and/or as input time instances.

The moment of time in block 410 may refer to the current (local or global) time as available for the UE 10, e.g. the current time of UE internal clock. The time instances and the moment of time may be absolute time values, such as UTC time values. It is possible to provide or define the time instances as relative time values, such as based on a system frame number. The UE may compare the (current) moment of time to the time instances/information received from the network node in block 400 and identify which time instance and frequency is associated with the moment of time.

Figure 5:
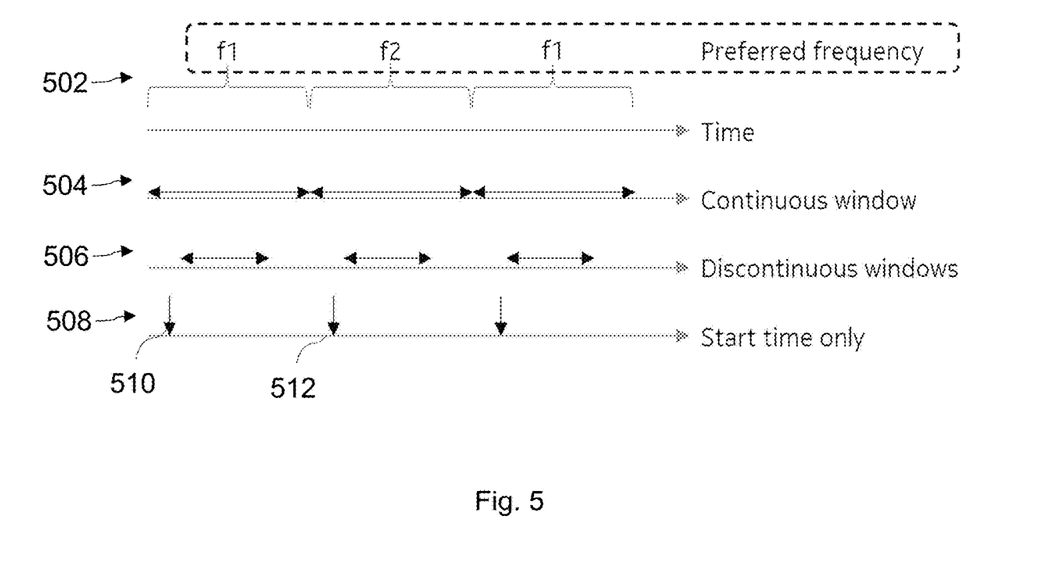
FIG. 5 illustrates examples of indicating preferred frequencies and associated time instants.

There is a plurality of available options on how the time instances may be indicated by the network node, affecting also how the relevant time instance and associated frequency is identified. Some example embodiments are illustrated in FIG. 5.

The dependency may indicate an absolute point in time where a frequency is preferred over another. The dependency may comprise a list of frequencies as a function of time, as illustrated by 502. In another example embodiment, the dependency comprises at least one time window 504, 506 for prioritizing at least one frequency. Time windows may be continuous or discontinuous. In a still further example, start times of when to use a specific frequency are indicated 508.

In a further example, the network node may know, based on power saving state configuration, e.g. eDRX or PSM configuration, when the UE 10 is reachable (i.e. listening periods during eDRX or periodic TAU) and the periods the device is not reachable if there is no traffic to be sent in uplink (i.e. standby during eDRX or PSM). The network node, in the present example the AMF, may thus define and indicate the prioritized frequency as a function of the time by:

a) Continuous list of time windows (504): The list of time windows the AMF provides to the RAN and later is forwarded to the UE may describe a continuous set of time. For example, timewindow1=[0 s, 3 s], timewindow2=[3 s, 6 s], or b) Discrete list of time windows (506): The list of time windows the AMF provides to the RAN and later is forwarded to the UE may describe a discrete set of time focused on the periods the network knows the UE is going to be reachable. For example, timewindow1=[0.5 s, 0.8 s], timewindow2=[3.5 s, 3.8 s]. If the UE wakes up outside the specified windows it may pick the frequency of the nearest window (in time domain).

Instead of time windows the network node may indicate 508 the absolute/relative point in time 510, 512 where a frequency is now the preferred. Then that frequency is preferred until the next time index and thus the next frequency, e.g. f1 is applied after start time 510, until reaching the next start time 512 for f2.

Figure 6:
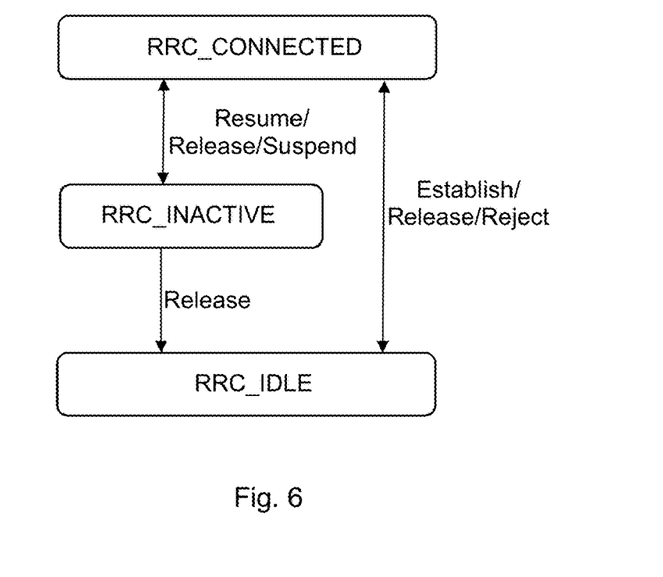
FIG. 6 illustrates radio resource control states.

With reference to FIG. 6 illustrating 3GPP 5G RRC states, the power saving state may be the RRC_IDLE state or the RRC_INACTIVE state, consuming less resources than RRC connected state. The UE 10 performing the method of FIG. 4 may be configured to perform an RRC state machine as illustrated in FIG. 6. In another example embodiment, the UE may be configured to perform a state machine comprising (only) idle and connected states, such as RRC_IDLE and RRC_CONNECTED states e.g. by an NB-IoT UE.

The RRC_INACTIVE is a new state introduced in 3GPP NR Rel-15 complementing the existing states, RRC_CONNECTED and RRC_IDLE, with the goal of lean signalling and energy-efficient support of NR services. A UE is either in RRC_CONNECTED state or in RRC_INACTIVE state when an RRC connection has been established. If this is not the case, i.e. no RRC connection is established, the UE is in RRC_IDLE state. The RRC_INACTIVE state enables to quickly resume the RRC connection and start the transmission of small or sporadic data with a much lower initial access delay and associated signalling overhead as compared to the RRC_IDLE state. As UE context is still stored in the gNB in the RRC_INACTIVE state, and when the UE resumes from RRC_INACTIVE to RRC_CONNECTED, the core network does not need to be contacted by the gNB to retrieve information about the UE to establish a new UE context.

As compared to keeping the UE 10 in RRC_CONNECTED state, the new state reduces mobility signalling both to RAN (e.g. RRC measurement reporting, handover messages) and to the core network (e.g. to/from the AMF) since connection management (CM) state of the UE is still CM-CONNECTED (instead of CM-IDLE in RRC_IDLE state).

In Rel-15, the transition from RRC_INACTIVE to RRC_IDLE is controlled by the network and requires a pair of RRC messages by the UE and network. Typically, it requires that the UE is first moved to RRC_CONNECTED and only afterwards it will be moved to RRC_IDLE (i.e. RRC transition from Inactive to Idle via Connected state). The network may alternatively transmit an RRC release message (to move the UE directly to RRC_IDLE).

While in RRC_INACTIVE or RRC_IDLE state, the UE is in a low power "sleep" mode to reduce battery consumption. It wakes up periodically based on a configured paging cycle value.

NB-IoT is designed for infrequent and short messages between the UE and the network. It is assumed that the UE can exchange these messages while being served from one cell, therefore, a handover procedure during RRC_CONNECTED is not needed (or not supported in Rel-16). If such a cell change would be required, the UE has first to go to the RRC_IDLE state and re-select another cell therein. This may happen through the UE experiencing a RLF, because of too any "out of sync" messages. For the RRC_IDLE state, cell re-selection is defined for both, intra frequency and inter frequency cells. In order to find a cell, the UE first measures the received power and quality of the Narrowband Reference Symbols (NRS). These values are then compared to cell specific thresholds provided by the SIB-NB (the NB-IoT specific System Information Block).

When the UE leaves RRC_CONNECTED, it may select another carrier to later find a cell to camp on. The RRCConnectionRelease message may indicate preferred frequencies with the presently disclosed time-dependency, on which the UE first tries to find a suitable cell. If the UE does not find a suitable cell on such preferred frequency associated with current time in the UE, it may try to find one on different frequencies.

The UE can request to enter PSM by including the timers T3324 and T3412 during an attach or tracking area update (TAU) procedure. T3324 is the period the UE remains in RRC_IDLE (monitoring paging) and T3412 controls the periodic TAU. The PSM duration is the difference between these timers (T3412-T3324). The network may accept the value requested by the UE or set different ones. The maximum time a device may sleep, using PSM, is approximately 413 days (set by 3GPP Release 13 for T3412). The maximum time a device may be reachable is 186 minutes (an equivalent of the maximum value of the Active timer T3324).

The UE may transition to an active state, such as the RRC_CONNECTED, and define 410 which frequency to use after the transition. The UE may perform block 410 also when in the power saving state, such as the RRC_IDLE or RRC_INACTIVE, e.g. in order to monitor paging or system information, perform cell selection or reselection, and/or other power saving mode specific procedures.

Figure 7:
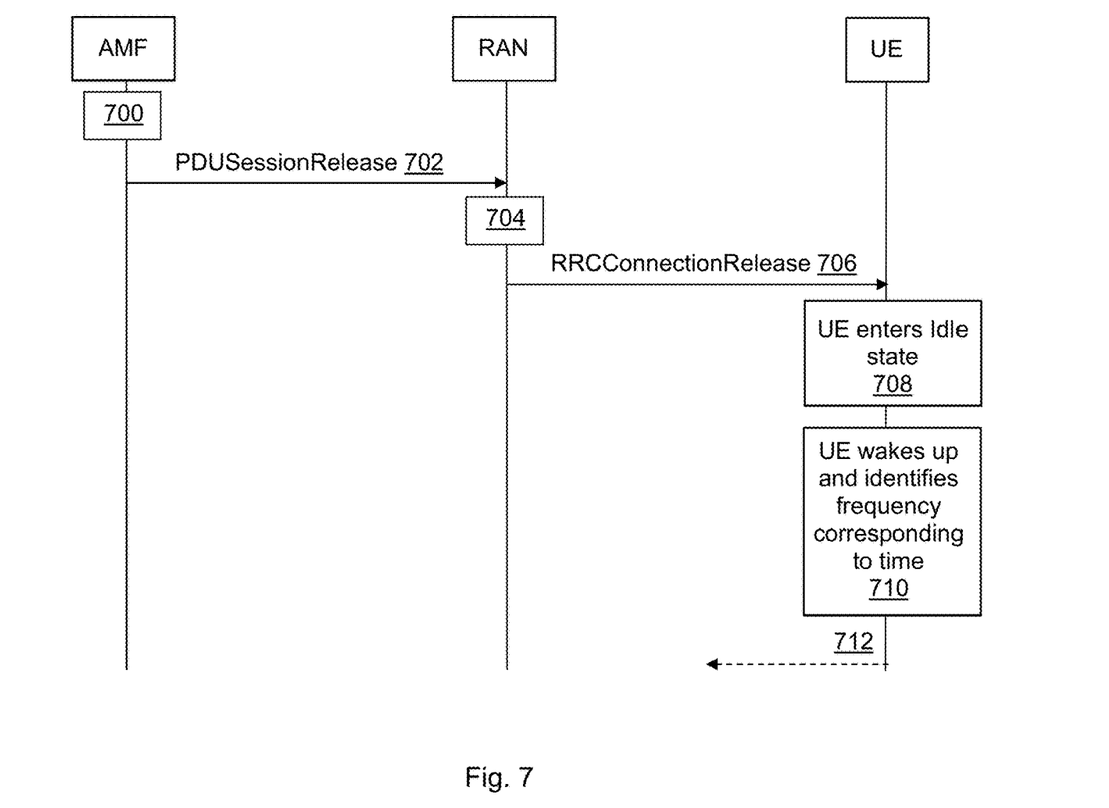
FIG. 7 is a signalling example in accordance with some embodiments.

In some example embodiments, the indication of block 310 and 400 is comprised in RRC signaling, such as RRC release message. As another example, the indication may be included in NAS Mobility Management (MM) messages between the AMF and the UE (where gNB transparently forwards the information). Then, the RRC message to use may be DLInfoTransfer (with the NAS MM encapsulated data). Instead of unicast message, a multicast message to more than one UE may be applied for transmitting indications of frequencies and associated time instances, FIG. 7 illustrates a signaling example for a 3GPP 5G NR system, e.g. for NB-IoT UE. The AMF may in block 700 define which cells are the best ones for the UE, e.g. based on ephemeris data and UE location information. The AMF may be configured to perform method of FIG. 3 and define cells and their frequencies, which will be the best cells for a UE. The AMF may send this information to the RAN, such as the gNB, during the PDU Session Release procedure 702. The RAN may detect 704 need to signal this to the UE, perform block 300 based on the information received from the AMF. The RAN may then transmit (310) the indication of the identified dependency by RRCConnectionRelease 706 to the UE, which may also trigger activation of eDRX and/or PSM.

The UE may, in response to message 706, enter 708 RRC_IDLE state and store the received dependency information. Upon waking up, the UE takes the list into account and identifies 710 frequency corresponding to the current time, e.g. to prioritize correct frequency at the time it needs to connect 712 to a new cell.

This enables the UE to listen to the most optimal or best cell instead of listening to a cell further away, and avoid the drawbacks and error when tuning into a frequency of such more remote cell.

Below is an example information element comprising information on carrier frequencies to be prioritized (FreqPriority):

```
FreqPriorityList ::=   SEQUENCE (SIZE (1 ..maxFreq)) OF FreqPriority
TIMEPriorityList :: =  SEQUENCE (SIZE (1..maxFreq)) OF TIMESVALUES
TIMESVALUES : =                    SEQUENCE {
    timeWindowStart                   SFN x,
    timeWindowStop                    SFN y
}
FreqPriorityListNR :: =  SEQUENCE (SIZE (L..maxFreq)) OF FreqPriorityNR
FreqPriority :: =        SEQUENCE {
    carrierFreq              ARFCN-ValueEUTRA,
    cellReselectionPriority  CellReselectionPriority,
    cellReselectionSubPriority  CellReselectionSubPriority
}
```

The TIMEPriorityList comprises time windows during which the different frequencies should be prioritized. The time can be absolute time (e.g. UTC) or relative time (e.g. System Frame Number based on anchor cell). As the system may be fully deterministic (it is known how the satellites and cells move), single preferred frequency may be enough per time window. Such information may be included in an RRC message, such as the RRCConnectionRelease message 706, e.g. in one or more CellReselectionPriorities, redirectedCarrierInfo, and idleModeMobilityControlInfo. However, it will be appreciated that other implementations are possible.

An electronic device comprising electronic circuitries may be an apparatus for realizing at least some embodiments of the present invention. The apparatus may be or may be comprised in a computer, a laptop, a tablet computer, a cellular phone, a machine to machine (M2M) or MTC device (e.g. an IoT sensor device), a wearable device, a base station, access point device, a network function element or node, or any other apparatus provided with radio communication capability. In another embodiment, the apparatus carrying out the above-described functionalities is comprised in such a device, e.g. the apparatus may comprise a circuitry, such as a chip, a chipset, a microcontroller, or a combination of such circuitries in any one of the above-described devices.

Figure 8:
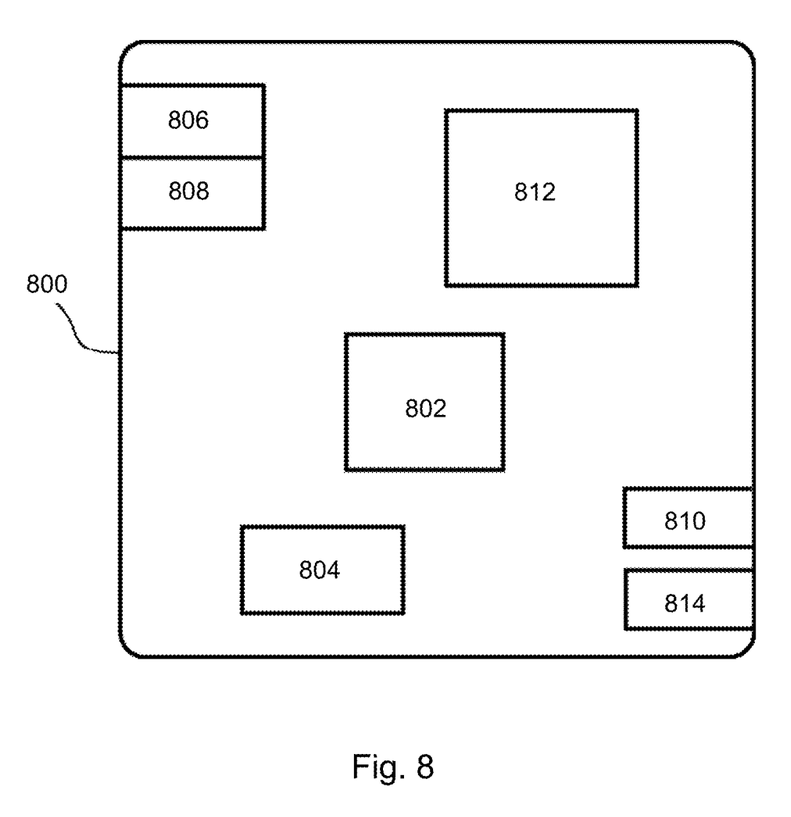
FIG. 8 illustrates an example apparatus capable of supporting at least some embodiments.

FIG. 8 illustrates an example apparatus capable of supporting at least some embodiments of the present invention. Illustrated is a device 800, which may comprise a communications device arranged to operate as the user equipment, e.g. the UE 10, or as the network node, e.g. the AN 20 or CN node 24, for example. The device may include one or more controllers configured to carry out operations in accordance with at least some of the embodiments illustrated above, such as some or more of the features illustrated above in connection with FIGS. 2 to 7. The device may be configured to operate as the apparatus configured to perform the method of FIG. 3 or 4, or embodiments thereof, for example.

Comprised in the device 800 is a processor 802, which may comprise, for example, a single- or multi-core processor wherein a single-core processor comprises one processing core and a multi-core processor comprises more than one processing core. The processor 802 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The device 800 may comprise memory 804. The memory may comprise random-access memory and/or permanent memory. The memory may comprise at least one RAM chip. The memory may comprise solid-state, magnetic, optical and/or holographic memory, for example. The memory may be at least in part accessible to the processor 802. The memory may be at least in part comprised in the processor 802. The memory 804 may be means for storing information. The memory may comprise computer instructions that the processor is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory may be at least in part comprised in the processor. The memory may be at least in part external to the device 800 but accessible to the device. For example, control parameters affecting controlling operations illustrated in connection with FIG. 3 or 4 may be stored in one or more portions of the memory and used to control operation of the apparatus. Further, the memory may comprise other control parameters and device-specific cryptographic information.

The device 800 may comprise a transmitter 806. The device may comprise a receiver 808. The transmitter and the receiver may be configured to transmit and receive, respectively, information in accordance with at least one wired or wireless, cellular or non-cellular standard. The transmitter may comprise more than one transmitter. The receiver may comprise more than one receiver. The transmitter and/or receiver may be configured to operate in accordance with global system for mobile communication, GSM, wideband code division multiple access, WCDMA, long term evolution, LTE, 5G or other cellular communications systems, WLAN, and/or Ethernet standards, for example. The device 800 may comprise a near-field communication, NFC, transceiver 810. The NFC transceiver may support at least one NFC technology, such as NFC, Bluetooth, Wibree or similar technologies.

The device 800 may comprise user interface, UI, 812. The UI may comprise at least one of a display, a keyboard, a touchscreen, a vibrator arranged to signal to a user by causing the device to vibrate, a speaker or a microphone. A user may be able to operate the device via the UI, for example to accept incoming telephone calls, to originate telephone calls or video calls, to browse the Internet, to manage digital files stored in the memory 804 or on a cloud accessible via the transmitter 806 and the receiver 808, or via the NFC transceiver 810, and/or to play games.

The device 800 may comprise or be arranged to accept a user identity module or other type of memory module 814. The user identity module may comprise, for example, a subscriber identity module, SIM, and/or a personal identification IC card installable in the device 800. The user identity module 814 may comprise information identifying a subscription of a user of device 800. The user identity module 814 may comprise cryptographic information usable to verify the identity of a user of device 800 and/or to facilitate encryption and decryption of communication effected via the device 800.

The processor 802 may be furnished with a transmitter arranged to output information from the processor, via electrical leads internal to the device 800, to other devices comprised in the device. Such a transmitter may comprise a serial bus transmitter arranged to, for example, output information via at least one electrical lead to memory 804 for storage therein. Alternatively to a serial bus, the transmitter may comprise a parallel bus transmitter. Likewise the processor may comprise a receiver arranged to receive information in the processor, via electrical leads internal to the device 800, from other devices comprised in the device 800. Such a receiver may comprise a serial bus receiver arranged to, for example, receive information via at least one electrical lead from the receiver 808 for processing in the processor. Alternatively to a serial bus, the receiver may comprise a parallel bus receiver.

The device 800 may comprise further devices not illustrated in FIG. 8. For example, the device may comprise at least one digital camera. Some devices may comprise a back-facing camera and a front-facing camera. The device may comprise a fingerprint sensor arranged to authenticate, at least in part, a user of the device. In some embodiments, the device lacks at least one device described above. For example, some devices may lack the NFC transceiver 810 and/or the user identity module 814.

The processor 802, the memory 804, the transmitter 806, the receiver 808, the NFC transceiver 810, the UI 812 and/or the user identity module 814 may be interconnected by electrical leads internal to the device 800 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

References throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or functional features may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof.

Furthermore, the described features, structures, or characteristics may be combined in any suitable manner in one or more embodiments. In the preceding description, numerous specific details are provided to provide a thorough understanding of some embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The invention claimed is:

1. An apparatus comprising:
   at least one processor,
   at least one memory including computer program code, the at least one memory and the computer program code being configured to, with the at least one processor, cause the apparatus at least to:
   receive, from a network node, an indication of a dependency between frequencies and time instances, wherein the dependency comprises a list of frequencies prioritized for a list of time values instances, wherein the list of frequencies prioritized for the list of time instances comprises a list of frequencies associated with at least one of: a continued list of time windows, a discrete list of time windows, or a list of absolute or relative points in time where a frequency is preferred;
   identify at least one frequency based on the indicated dependency and a moment of time; and
   select a cell utilizing the identified at least one frequency.

2. The apparatus of claim 1, wherein the apparatus is further caused to: transmit, prior to receiving the indication, information indicating location of the apparatus.

3. The apparatus of claim 1, wherein the identifying the at least one frequency is further based on location of the apparatus.

4. The apparatus of claim 1, wherein the network node is a radio access network node configured for a satellite unit or configured to communicate with the apparatus via a satellite unit, and the apparatus is further caused to connect or camp to the cell of the radio access network node by tuning to the identified at least one frequency.

5. The apparatus of claim 1, wherein the apparatus is or is comprised by a cellular user equipment device.

6. The apparatus of claim 1, wherein the dependency is based on at least one of: location information of the apparatus, frequency reuse information, or satellite ephemeris data.

7. The apparatus of claim 1, wherein the indicated dependency is further associated with at least one location or area on Earth and/or with satellite beam footprint.

8. The apparatus of claim 1, wherein a time instance of the list of time instances comprises a time window.

9. The apparatus of claim 1, wherein the selected cell is used for wireless communications after waking up from a power saving state.

10. An apparatus, comprising:
    at least one processor,
    at least one memory including computer program code, the at least one memory and the computer program code being configured to, with the at least one processor, cause the apparatus at least to:
    identify a dependency between frequencies and time instances for use by a user equipment to select a cell; and
    transmit an indication of the identified dependency to the user equipment, wherein the identified dependency comprises a list of frequencies prioritized for a list of time instances, wherein the list of frequencies prioritized for the list of time instances comprises a list of frequencies associated with at least one of: a continued list of time windows, a discrete list of time windows, or a list of absolute or relative points in time where a frequency is preferred, wherein the dependency enables the user equipment to determine at least one frequency based on a moment of time and select a cell utilizing the determined at least one frequency.

11. The apparatus of claim 10, wherein the apparatus is further caused to receive information indicating location of the user equipment, and the identifying is based on the information indicating the location of the user equipment.

12. The apparatus of claim 10, wherein the apparatus is or is comprised by a radio access network node or a core network node.

13. The apparatus of claim 10, wherein the dependency is based on at least one of: location information of the user equipment, frequency reuse information, or satellite ephemeris data.

14. The apparatus of claim 10, wherein the indicated dependency is further associated with at least one location or area on Earth and/or with satellite beam footprint.

15. A method, comprising:
    receiving, by a user equipment and from a network node, an indication of a dependency between frequencies and time instances, wherein the dependency comprises a list of frequencies prioritized for a list of time instances, wherein the list of frequencies prioritized for the list of time instances comprises a list of frequencies associated with at least one of: a continued list of time windows, a discrete list of time windows, or a list of absolute or relative points in time where a frequency is preferred;
    identifying at least one frequency based on the indicated dependency and a moment of time; and
    selecting a cell utilizing the identified at least one frequency.

16. The method of claim 15, further comprising: transmitting, prior to receiving the indication, information indicating location of the user equipment.

17. The method of claim 15, wherein the identifying the at least one frequency is further based on location of the user equipment.

18. The method of claim 15, wherein a time instance of the list of time instances comprises a time window.

* * * * *